United States Patent [19]
Gershon

[11] Patent Number: 5,310,345
[45] Date of Patent: May 10, 1994

[54] WRITING AID

[76] Inventor: Joshua Gershon, 149 Yale St., Roslyn Heights, N.Y. 11577

[21] Appl. No.: 55,325

[22] Filed: May 3, 1993

[51] Int. Cl.⁵ .............................................. G09B 11/00
[52] U.S. Cl. ...................................... 434/166; 401/7; 15/443
[58] Field of Search ................... 434/166, 162, 260; 401/7, 8; 15/443, 437

[56] References Cited

U.S. PATENT DOCUMENTS

| 2,709,419 | 5/1955 | Appel | 401/8 |
| 3,019,769 | 2/1962 | Ballard | 401/7 |
| 4,846,710 | 7/1989 | Campbell | 434/166 |

FOREIGN PATENT DOCUMENTS

| 0471449 | 2/1929 | Fed. Rep. of Germany | 15/443 |
| 0473906 | 3/1929 | Fed. Rep. of Germany | 15/443 |

*Primary Examiner*—Gene Mancene
*Assistant Examiner*—Jeffrey A. Smith
*Attorney, Agent, or Firm*—Galgano & Burke

[57] ABSTRACT

A writing aid for both left- and right-handed persons, and especially intended for young children, includes a central section having a first side and a second opposite side and means which receives and holds an elongated writing instrument between the first and second sides. A first sleeve is attached to the first side of the central section defining a finger-receiving first pocket and a second sleeve is attached to the second side of the central section defining a finger-receiving second pocket. The sleeves and associated pockets are configured and dimensioned and angularly offset with respect to one another in such a manner that the user's thumb may be inserted into one of the finger-receiving pockets and the user's index finger may be inserted into the other of the finger-receiving pockets so that they are oriented for holding a writing instrument received and held in the central section in proper writing position.

4 Claims, 2 Drawing Sheets

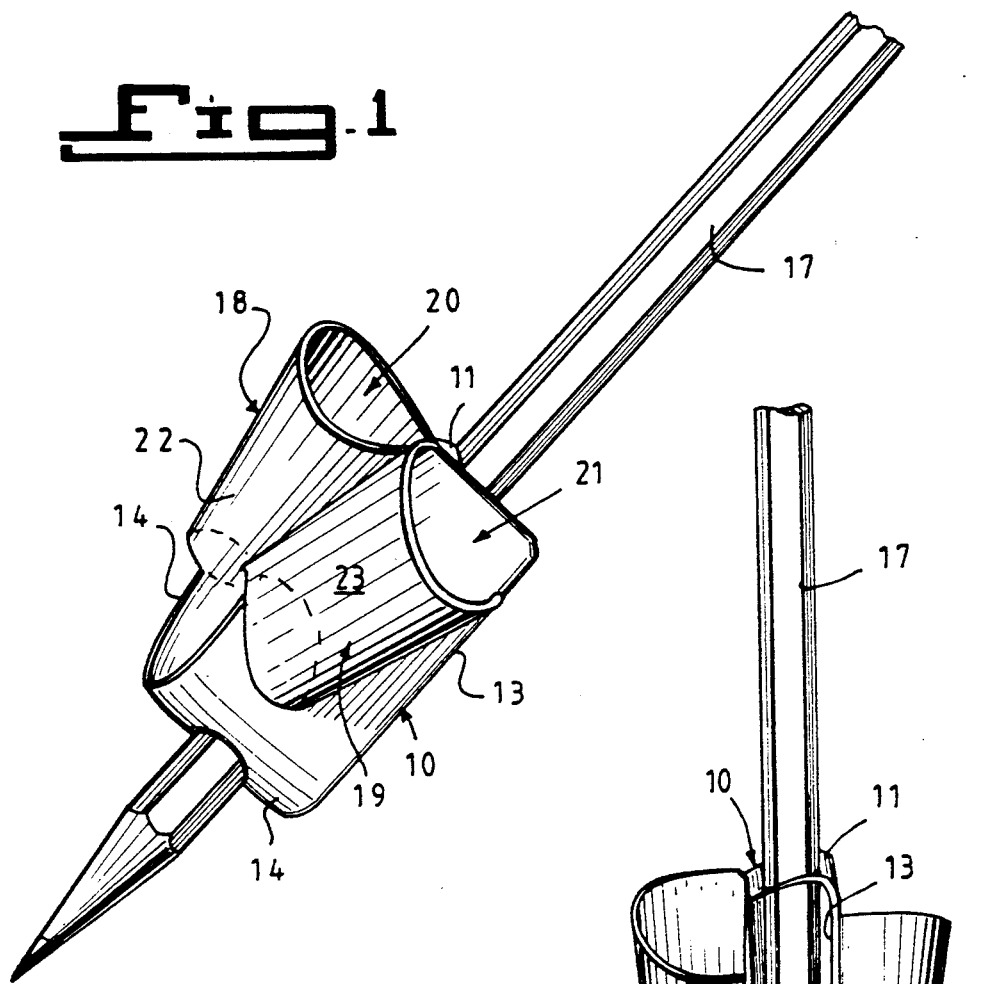
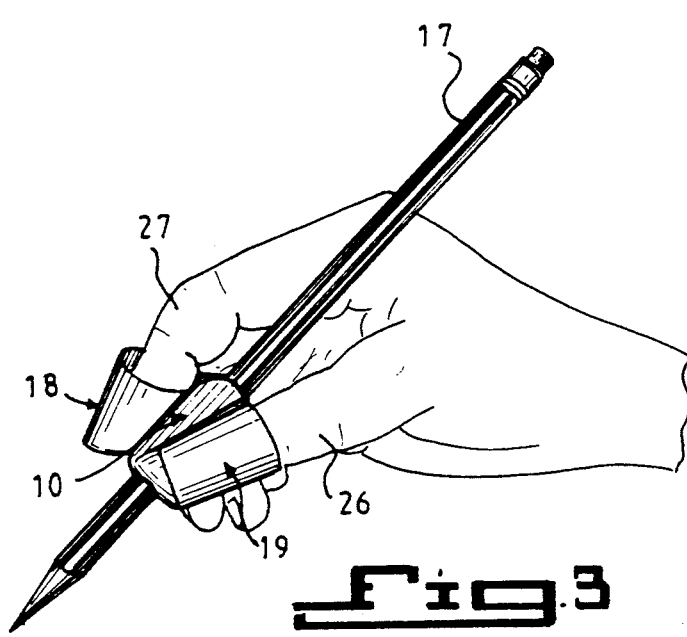

WRITING AID

BACKGROUND OF THE INVENTION

The present invention relates to a writing aid to assist persons in holding writing instruments. More particularly, it relates to such a writing aid which teaches young persons the correct way to hold a writing instrument and which also helps disabled or arthritic people in gripping a writing tool.

Children who are first learning how to draw and write with crayons and pencils tend to grip and hold the selected writing instrument in an improper fashion which may impede their progress in learning how to write and draw. Various writing aids have been proposed to teach youngsters how to properly grip a writing instrument (see, e.g., U.S. Pat. Nos. 1,783,657; 2,709,419; and 4,738,556).

More particularly, Rusk, U.S. Pat. No. 4,526,547 discloses a writing aid which consists of a body having an internal bore through which a writing instrument is inserted and three gripping surfaces positioned for the user's three fingers to ensure proper position. Both left-handed and right-handed models are provided for left-handed and right-handed writers.

In addition, Campbell, U.S. Pat. No. 4,846,710, discloses a writing aid which includes a first sleeve dimensioned and configured for engaging the forefinger and a second sleeve attached to the first sleeve for holding a writing instrument; see, also, Murray et al., U.S. Pat. No. 1,607,775, which disclosed a somewhat similar design. Mockel, U.S. Pat. No. 1,702,660, also discloses a writing aid which includes a central sleeve designed to be pushed over the index or forefinger and an S-shaped clamp which is designed to place the thumb and middle finger in proper position relative to the index finger for writing; but in this case, no provision is made for the writing aid to hold the writing instrument.

In addition, several writing aids have been proposed to held handicapped and arthritic persons grip writing and other instruments (see, e.g., U.S. Pat. Nos. 2,501,552; 4,602,885 and 4,606,484).

By and large, the writing aids are complicated in construction, difficult to use or not easily adaptable to both right- and left-handed users. Indeed, so far as is known, there is no presently available writing aid which facilitates the proper holding of writing instruments by both young children and handicapped persons whether left- or right-handed in a simple and yet highly effective manner as herein proposed.

SUMMARY OF THE INVENTION

Accordingly, it is an object of the present invention to provide a novel writing aid for both young children, especially preschool children, and handicapped persons which facilitates the holding of a writing instrument in a proper fashion.

It is another object of the present invention to provide such a novel writing aid which is relatively adaptable to both left- and right-handed persons and is easy to use.

It is a further object of the present invention to provide such a novel writing aid which is economical to fabricate, durable and of relatively simple construction.

Certain of the foregoing and related objects are readily attained according to the present invention by the provision of a writing aid for both left- and right-handed persons, which includes a central section having a first side and a second opposite side and means between the first and second sides for receiving and holding an elongated writing instrument. A first sleeve is attached to the first side of the central section defining a finger receiving first pocket and a second sleeve is attached to the second side of the central section defining a finger-receiving second pocket. The sleeves and associated pockets are configured and dimensioned and angularly offset with respect to one another in such a manner that the user's thumb may be inserted into one of the finger-receiving pockets and the user's index finger may be inserted into the other of the finger-receiving pockets so that they are oriented for supporting a writing instrument received in the central section in proper writing position.

Preferably, the sleeves have closed bottom ends and the writing aid is made from a synthetic resinous material.

In a particularly preferred embodiment, the means for receiving comprises at least one central bore configured and dimensioned to accept a writing instrument therein in a friction fit manner. The central section advantageously comprises a general oval web having a top wall, a bottom wall, and two sidewalls and wherein the top and bottom walls each have a central bore formed therethrough in general vertical registry with one another through which the writing instrument may be inserted in a friction fit manner.

BRIEF DESCRIPTION OF THE DRAWINGS

Other objects and features of the present invention will become apparent from the following detailed description considered in connection with the accompanying drawings which disclose one embodiment of the present invention. It should be understood, however, that the drawings are designed for the purpose of illustration only and not as a definition of the limits of the invention.

In the drawings, wherein similar reference characters denote similar elements throughout the several views:

FIG. 1 is a fragmentarily-illustrated view of the writing aid embodying the present invention holding a pencil;

FIG. 2 is a fragmentarily-illustrated top elevational view of the writing aid and pencil shown in FIG. 1;

FIG. 3 is a perspective view of the writing aid and pencil with a user's hand inserted therein.

DETAILED DESCRIPTION OF THE PREFERRED EMBODIMENTS

Figure 4:
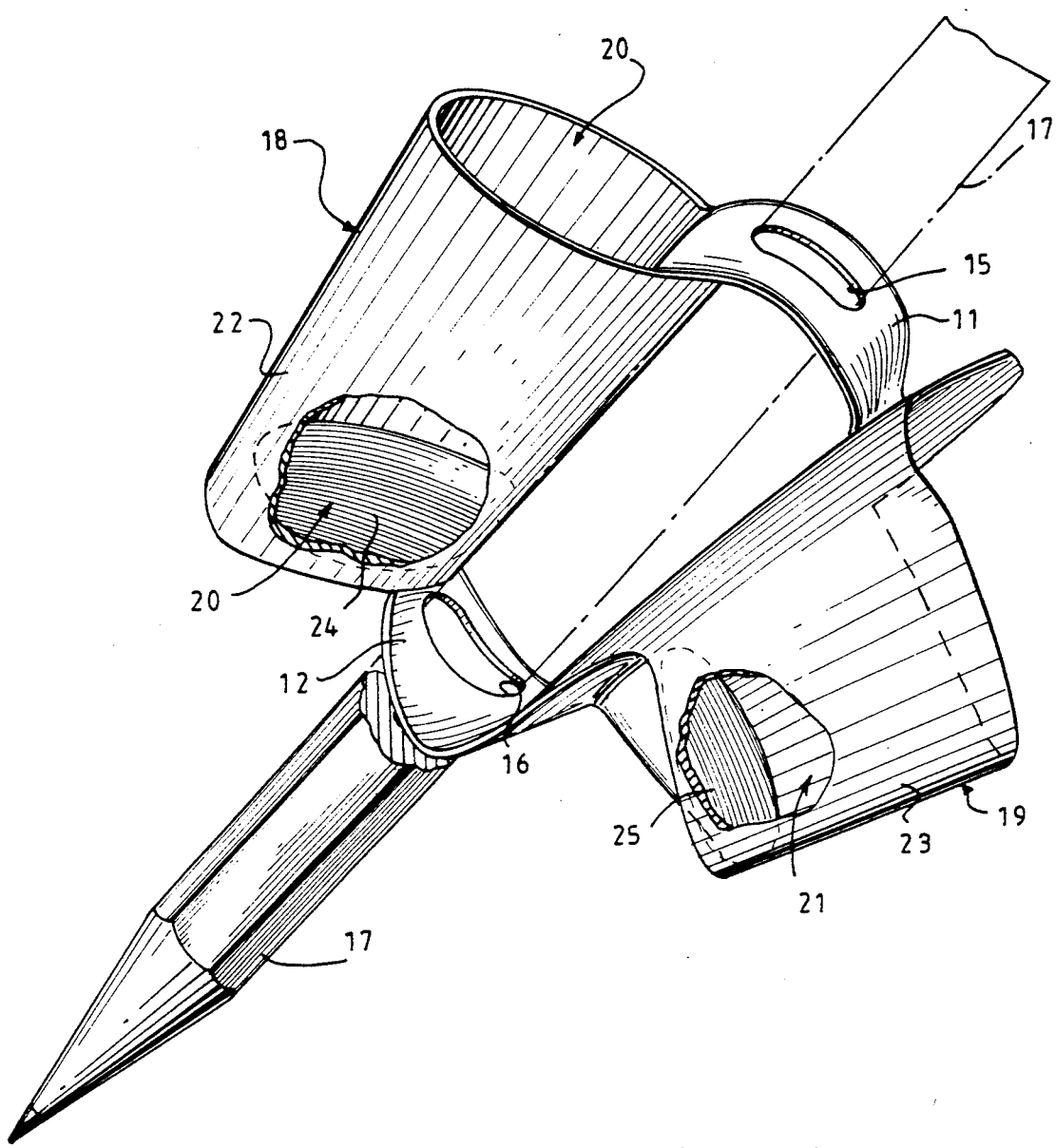
FIG. 4 is an enlarged perspective view, in part section, of the writing aid and pencil, with portions broken away to show construction.

Turning now in detail to the drawings, therein illustrated is a novel writing aid embodying the present invention which, as seen best in FIGS. 1, 2 and 4, includes a central, generally oval-shaped, web-like section 10 composed of a top wall 11, a bottom wall 12, and two sidewalls 13, 14. As seen best, in FIG. 4, the top and bottom walls 11, 12, each having central bores 15, 16 formed therethrough configured and dimensioned to receive therethrough in a friction fit manner a writing instrument 17, e.g., a pencil, although, of course, any type of writing instrument, e.g., a pen, crayon, marker, etc., could be employed by modifying the size of bores 15, 16.

A pair of bucket or pail-shaped sleeve elements 18, 19 defining finger-receiving pockets 20, 21, are integrally-joined to opposite sidewalls 13, 14 of the central section 10. The sleeve elements are composed of a generally cylindrical sidewall 22, 23 which are closed off at the bottom by a base wall 24, 25 which serve to prevent one from inserting one's finger too far and perhaps getting them stuck.

As shown best in FIG. 3, the sleeve elements 18, 19 are angularly offset with respect to one another so that when a user's thumb 26 and index or forefinger 27 are inserted into the finger-receiving sleeve elements 18, 19, the user's fingers will naturally assume the proper orientation for correct gripping. The user's middle finger will also naturally assume a correct supporting position behind the pencil 17 held by the central section 10 once the user's fingers are so inserted into the finger receiving pockets 20, 21.

The same writing aid can be used by both left- and right-handed persons by simply reversing the pockets 20, 21 that the fingers 26, 27 are inserted into. The writing aid, while especially useful for young, preschool children, would also be readily adaptable to arthritic or handicapped persons. The device is preferably made of one piece, injection molded plastic. Of course, the size and configuration of the writing aid can be modified to suit the particular application intended so long as the functional interrelationship of the central section and side sleeve elements are not significantly altered.

Accordingly, while only one embodiment of the present invention has been shown and described, it is to be understood that many changes and modifications may be made thereunto without departing from the spirit and scope of the invention as disclosed herein.

What is claimed is:

1. A writing aid for both left- and right-handed persons, comprising:
    a central section having first side and second oppositely facing sides separated to form a space therebetween with the tops and bottoms of said sides being joined by top and bottom walls, respectively, each of said top and bottom walls being provided with an opening aligned with each other for receiving and holding in frictional engagement an elongated writing instrument visible through said space between said first and second sides to assist the user to naturally assume the correct position for grasping said writing instrument;
    a first sleeve attached to said first side of said central section defining a finger receiving first pocket and a second sleeve attached to said second side of said central section defining a finger-receiving second pocket, said sleeves and associated pockets being configured and dimensioned and angularly offset with respect to one another in such a manner that the user's thumb may be inserted into one of said finger-receiving pockets and the user's index finger may be inserted into the other of said finger-receiving pockets so that they are oriented for holding said writing instrument received and held in said central section in proper writing position.

2. The writing aid according to claim 1, wherein said sleeves have closed bottom ends.

3. The writing aid according to claim 1, wherein said writing aid is made from a synthetic resinous material.

4. The writing aid according to claim 1, wherein said central section comprises a general oval web.

* * * * *